Figure 1:
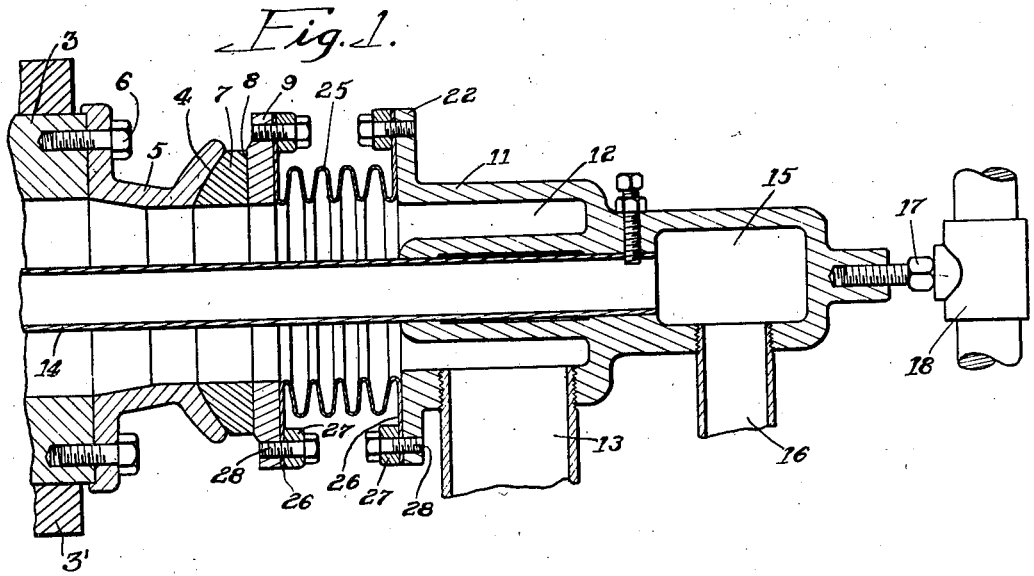

June 25, 1929. A. ALDRICH ET AL 1,718,209

STEAM FITTING FOR JOURNALS OF ROTARY STEAM CYLINDERS OR THE LIKE

Filed Nov. 24, 1924

Inventors:
Alonzo Aldrich
Earl E. Berry
By Wilson & McKenna Attys.

Patented June 25, 1929.

1,718,209

UNITED STATES PATENT OFFICE.

ALONZO ALDRICH AND EARL E. BERRY, OF BELOIT, WISCONSIN, ASSIGNORS TO BELOIT IRON WORKS, OF BELOIT, WISCONSIN, A CORPORATION OF WISCONSIN.

STEAM FITTING FOR JOURNALS OF ROTARY STEAM CYLINDERS OR THE LIKE.

Application filed November 24, 1924. Serial No. 751,941.

The primary purpose of this invention is to provide improved means for maintaining a pressure tight joint between a fluid pressure fitting or conduit and a hollow rotary body, and, furthermore, to maintain an approximately constant predetermined pressure between the bearing parts at the joint independently and regardless of variations or fluctuations in the fluid pressure. In the application of our invention to apparatus using steam as the fluid pressure, it is our object to provide a balanced steam joint as this desideratum is understood in the art.

The present invention is an improvement embodying the invention claimed in application, Serial No. 751,943, filed November 24, 1924.

Our invention is especially adapted for application to drying cylinders of paper drying machines where it is desired to maintain a steam tight, low friction joint between the steam supply fitting or conduit and the end of a hollow rotary journal to which it connects. In such use the steam pressure varies and heretofore with conventional steam fitting connections, considerable difficulty has been experienced because of the inability to maintain a steam tight joint between the fitting and rotary journal without adjustment when the pressure varies. As a consequence, when a fitting is set to maintain a steam tight joint under a given maximum pressure and the steam pressure exceeds this amount, leakage will occur, and when the pressure drops, excessive friction and wear will be imposed on the faces of the bearing members, thereby causing premature failure of the joint. Such prior constructions have, furthermore, required frequent inspection and adjustment. One of the purposes of the present invention is therefore to overcome these objections by the provision of a fitting of this kind which will function to maintain a steam tight joint with minimum friction under variations in steam pressure.

We have also aimed to so construct the fitting that its function will not be disturbed by expansion and contraction or by slight displacement of the parts incidental to temperature changes, settling, etc., or by disalignment or eccentricity between the rotatable and non-rotatable parts.

Our invention is characterized in its present application by the provision of a flexible lengthwise expansible steam conduit interposed between a substantially rigid stationary steam conduit and a bearing part, which seats against one end of a hollow journal of a rotary drying cylinder, and in the provision of adjustable pressure-exerting means such as compression springs interposed between said rigid conduit and bearing part for maintaining an approximately constant pressure between the bearing surfaces of the steam joint. By reason of this arrangement the changes in steam pressure do not act on the bearing member to affect the function of said pressure-exerting means; consequently the pressure between the bearing faces at said joint is maintained independently of variations in the steam pressure.

Our invention, in one of its broadest aspects, contemplates the provision of improved means for maintaining a steam tight joint or joints between a hollow rotary body and a steam or other perssure supply or delivery conduit, including a flexible, lengthwise expansible element such as a tubular, axially-corrugated metal wall or conduit interposed in or otherwise associated with the steam supply conduit so as to make the terminus bearing part active or responsive to a supplemental force utilized for urging said member against a complemental bearing member of the joint. And, while in the present application we employ spring pressure for imposing said supplemental force, it should be understood that our invention contemplates the use of any force either supplemental to or inherent in the expansible element. Furthermore, in its broadest aspect, our invention is predicated on the application of a flexible conduit section or an axially-corrugated tubular element of the character disclosed herein, utilized to urge a joint, connection or a bearing part against a rotatable body as a factor in maintaining a tight joint and compensating for disalignment or eccentricity between the rotatable and non-rotatable parts.

Referring to the drawings—

Figure 2:
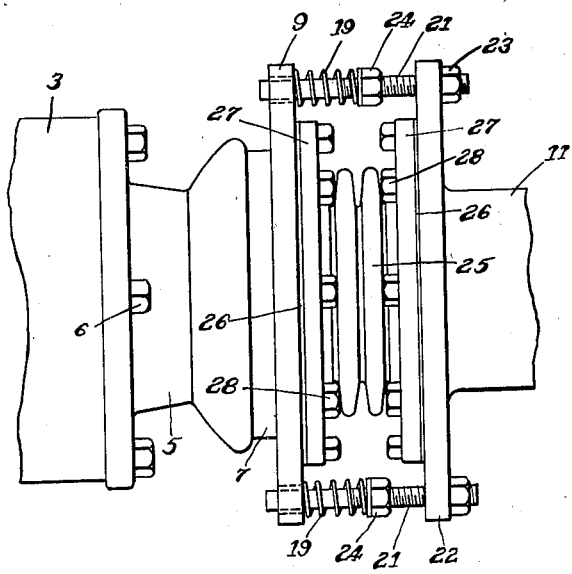

Figure 1, is a vertical sectional view longitudinally through a steam fitting for journals embodying our invention; and Fig. 2 is a top view of the joint portion thereof.

The hollow journal of the drying cylinder above-mentioned is indicated by reference numeral 3 and its supporting bearing by 3'. The steam fitting through which steam is delivered to the journal and the cylinder bears against a steam-fit seat 4 at present formed on a supplemental part 5 attached to the journal by bolts 6. Said seat is preferably, but not necessarily, spherical and has a ground finish.

The steam fitting assembly terminates at one end in a bearing surface complemental to and seating against the seat 4. In this case the terminus bearing surface is provided by a disc member 7 having a spherical face seating against the rotatable seat 4 and a flat seat 8 against a non-rotatable bearing part 9.

Pressure-exerting means which will be presently described urges the bearing part 7 against the seat 4, this means being interposed between the bearing part 9 and a relatively rigid housing designated generally by 11 which is shaped to provide a steam conduit. Steam is delivered into the compartment 12 of this housing by a pipe 13. The housing is also shaped to provide part of a condensate siphon which includes a pipe 14 rigidly attached at one end to the housing and communicating through a compartment 15 therein with a depending condensate outlet pipe 16, the opposite or inlet end of the condensate pipe 14 (not shown) extending within and to a low level in the drying cylinder as is well known in this art. The steam compartment 12 and the condensate apartment 15 in the housing 11 are of course, separated by an intervening wall.

Means is provided for resisting the action of the steam pressure within the housing or fitting tending to move it away from the journal and allow escape of steam thru the joint or joints as the case may be. This means comprises in the present instance a thrust screw 17 threaded in the housing 11 and bearing against a relatively stationary member 18. It will be manifest that this screw 17 affords a means for adjusting the housing or conduit 11 lengthwise and consequently increasing or decreasing the pressure of the terminus bearing part against the rotatable body.

The supplemental pressure-exerting means above referred to between the housing 11 and bearing part 9 comprises in this instance a plurality of coiled compression springs 19 on bolts 21 threaded in a flange 22 on the housing and passing loosely through holes in said part 9 at diametrically opposite positions in a horizontal plane. Each bolt 21 is locked to the flange 22 by a nut 23 and carries a nut 24 against which one end of its spring acts, the opposite end acting against the part 9. By adjustment of the nuts 24 the springs 19 may be put under such compression as to exert a predetermined pressure for holding the bearing part 9 against the bearing disc 7 and the latter against the seat 4.

The steam conduit between the housing 11 and the axially movable bearing part which seats against the journal is established by a flexible or lengthwise extensible conduit designated generally by 25 which in the preferred embodiment is in the form of a tubular, axially-corrugated metal wall suitably attached at its ends to the contiguous parts 9 and 22. In the form shown, the conduit 25 has wide end flanges 26 secured by clamping rings 27 and screws 28 to said contiguous parts. This bellows-like conduit provides a certain degree of flexure and axial expansion between the relatively rigid housing 11 and the terminus bearing part, the purpose and advantage of which will be presently apparent.

The operation is as follows: The steam pressure acting against the housing 11 tends to force it away from the journal, which force is resisted by the stationary member 18 so that said housing or conduit is in effect rigid as regards axial displacement away from the journal. The position of said housing may however be adjusted by the screw 17 for reasons which will be presently noted. The disc bearing part 7 will be held against the journal seat 4 under a predetermined pressure exerted by the springs 19 which in turn act against the rigid housing 11. This spring pressure may obviously be adjusted by means of the nuts 24 to give the degree of pressure necessary for maintaining a steam tight joint between the bearing part 7 and the journal and also between said part and the bearing part 9. In this particular instance, the bearing part 7 has a steam-fit face at each end and is free to revolve; consequently it is necessary to maintain both joints steam tight. Our invention is not however confined to plural joints but comprehends primarily a single seat between a rotating part such as the journal or any rotating body and a bearing part which might be integral with the part 9. Fluctuations or variations in the steam pressure do not affect the action of the pressure-exerting means or springs 19 against the bearing part 7 by reason of the fact that pressure acts lengthwise against the housing 11 which is a rigid resistance and its action radially is balanced. Consequently an approximately fixed or constant predetermined pressure may be maintained between the surfaces making up the steam tight joint, independently and regardless of variations or fluctuations in the steam pressure. By reason of the approximately constant pressure a low friction joint may be maintained, thus promoting long life. It will be noted that the flexible conduit or coupling is not responsive to variations in steam pressure in so far as translating longitudinal motion to the bearing part 9 is concerned. The flexible coupling accommodates or compensates for ordinary displacement and disalignment between the cooperating parts due to expansion and contraction resulting from changes in temperature, to settling of pipes, and to other reasons known to the art. The pressure between the bearing faces may be increased or decreased either by adjustment of the nuts 24 or the thrust screw 17, or both; adjustment of the screw 17 serving also to allow convenient takeup to compensate for any deflection or yield of the stationary member 18.

It should be observed that one of the principal factors contributing to our invention is the application of a bellows-like steam conduit or element arranged so that by its flexibility or expansive action one of the bearing parts is active or responsive to a yielding pressure, in this case the pressure of the springs 19 for maintaining a steam tight joint. However, our invention contemplates the use of any suitable force for urging the terminus bearing part against the rotating bearing seat, such force being either in the bellows coupling itself or being supplemental thereto. One of the advantages of our invention is that in practice any slight or ordinary deflection of the stationary member which in prior constructions would invariably cause leakage at the joint, is absorbed in the bellows-like conduit by reason of its expansion action.

It should be expressly understood that the term "steam" as used in the claims means any fluid, and that the invention defined by the claims may be applied with such other fluids.

It is believed that the foregoing conveys a clear understanding of the objects prefaced above, and while we have shown but a single working embodiment it should be understood that in putting our invention into practice, many changes might be made in the construction and arrangement without departing from the spirit and scope of the invention as expressed in the appended claims, in which—

We claim:

1. The combination of a hollow rotary journal having a bearing seat, a relatively rigid steam fitting, a bearing part complemental to said seat, means operative between said steam fitting and bearing part for urging the latter against the seat, a flexible steam coupling between the steam fitting and bearing part, means for adjusting the steam fitting axially with respect to the journal, and means for adjusting the pressure exerted by the first-mentioned means independently of said adjustment of the steam fitting.

2. The combination of a hollow rotary journal, a bearing part seated against said journal, a steam conduit housing, a flexible steam conduit connecting said housing and bearing part, pressure-exerting means operative between said housing and bearing part for seating the latter, and means for varying the pressure of the bearing part against the journal.

3. In combination, a hollow rotary journal, a supporting bearing for the journal, a steam supply fitting, a bearing member at one end of said fitting adapted to seat against the end of the journal, the steam pressure in said fitting tending to force it away from the journal, means stationary longitudinally with respect to the journal for resisting said force, said fitting including an axially corrugated and expansible bellows conduit adapted to be acted on by the steam pressure in the fitting to urge the said bearing member against the journal, and supplemental adjustable means acting against said bearing member for urging it against the journal.

ALONZO ALDRICH.
EARL E. BERRY.